United States Patent
Chou et al.

(10) Patent No.: US 11,854,476 B1
(45) Date of Patent: Dec. 26, 2023

(54) TIMING CONTROLLER HAVING MECHANISM FOR FRAME SYNCHRONIZATION, DISPLAY PANEL THEREOF, AND DISPLAY SYSTEM THEREOF

(71) Applicant: Novatek Microelectronics Corp., Hsinchu (TW)

(72) Inventors: Yao-Min Chou, Hsinchu (TW); Kai-Wen Shao, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/841,696

(22) Filed: Jun. 16, 2022

(51) Int. Cl.
*G09G 3/3208* (2016.01)
*G06T 1/20* (2006.01)

(52) U.S. Cl.
CPC .............. *G09G 3/3208* (2013.01); *G06T 1/20* (2013.01); *G09G 2310/08* (2013.01); *G09G 2360/02* (2013.01); *G09G 2360/18* (2013.01)

(58) Field of Classification Search
CPC .......... G09G 3/30; G09G 3/32; G09G 3/3208; G09G 3/3216; G09G 3/3225; G09G 3/3233; G09G 3/3258; G09G 3/3288; G09G 3/3275; G09G 3/3283; G09G 3/3291; G09G 3/36; G09G 3/3611; G09G 3/3614; G09G 3/3622; G09G 3/3625
USPC ........................ 345/76–83, 87–104
See application file for complete search history.

(56) References Cited

U.S. PATENT DOCUMENTS

| | | | |
|---|---|---|---|
| 9,472,133 B2 | 10/2016 | Kim et al. | |
| 10,043,459 B1* | 8/2018 | de Greef | ................ G09G 3/348 |
| 11,287,925 B2 | 3/2022 | Lin et al. | |
| 2013/0155036 A1 | 6/2013 | Kim et al. | |
| 2013/0321494 A1 | 12/2013 | Takaki | |
| 2015/0130824 A1* | 5/2015 | Lee | ........................ G09G 3/20 |
| | | | 345/534 |

(Continued)

FOREIGN PATENT DOCUMENTS

| | | |
|---|---|---|
| CN | 103177680 | 6/2013 |
| TW | 202113791 | 4/2021 |

OTHER PUBLICATIONS

"Office Action of Taiwan Counterpart Application", dated May 4, 2023, p. 1-p. 3.

*Primary Examiner* — Amit Chatly
*Assistant Examiner* — Nelson Lam
(74) *Attorney, Agent, or Firm* — JCIPRNET

(57) ABSTRACT

The disclosure is directed to a timing controller having a mechanism for frame synchronization, a display panel having the timing controller thereof, and a display system having the timing controller thereof. According to an aspect of the disclosure, the disclosure provides an integrated circuit which includes a timing controller to transmit a first TE signal to an application processor and receive a first image frame from the application processor after the application processor receives the first TE signal, and a control circuit to generate a first sync signal when the timing controller receives the first image frame, wherein when the application processor receives a second TE signal and the application processor is not ready to transmit a second image frame to the timing controller, the control circuit delays a first waiting period to generate a second sync signal.

18 Claims, 19 Drawing Sheets

(56) References Cited

U.S. PATENT DOCUMENTS

| | | | |
|---|---|---|---|
| 2016/0027146 A1* | 1/2016 | Kim | G09G 3/3208 345/82 |
| 2016/0063939 A1* | 3/2016 | Lee | G09G 3/3648 345/99 |
| 2016/0163264 A1 | 6/2016 | Nishimura et al. | |
| 2017/0193971 A1* | 7/2017 | Bi | G09G 5/18 |
| 2018/0033360 A1* | 2/2018 | Bae | G09G 3/2003 |
| 2020/0335062 A1 | 10/2020 | Huard et al. | |
| 2021/0089188 A1 | 3/2021 | Lin et al. | |
| 2022/0114946 A1 | 4/2022 | Howard et al. | |

* cited by examiner

Base frame rate 120Hz

| Scenario | SEQ1 | | | SEQ2 | | | SEQ3 | | | SEQ4 | | | SEQ5 | | |
|---|---|---|---|---|---|---|---|---|---|---|---|---|---|---|---|
| | ACT | BLANK | Frame Rate | ACT | BLANK | Frame Rate | ACT | BLANK | Frame Rate | ACT | BLANK | Frame Rate | ACT | BLANK | Frame Rate |
| Game | 1 | 0 | 120Hz | 1 | 1 | 60Hz | 1 | 3 | 30Hz | 1 | 11 | 10Hz | 1 | 23 | 5Hz |
| Video | 1 | 1 | 60Hz | 1 | 3 | 30Hz | 1 | 11 | 10Hz | 1 | 16 | 7Hz | 1 | 23 | 5Hz |
| Message | 1 | 3 | 30Hz | 1 | 11 | 10Hz | 1 | 16 | 7Hz | 1 | 20 | 6Hz | 1 | 23 | 5Hz |
| Web | 1 | 11 | 10Hz | 1 | 12 | 9Hz | 1 | 16 | 7Hz | 1 | 20 | 6Hz | 1 | 23 | 5Hz |

FIG. 7

| Scenario | SEQ1 | | | SEQ2 | | | SEQ3 | | | SEQ4 | | | SEQ5 | | |
|---|---|---|---|---|---|---|---|---|---|---|---|---|---|---|---|
| | ACT | BLANK | Frame Rate | Wait Time | ACT | BLANK | Frame Rate | ACT | BLANK | Frame Rate | ACT | BLANK | Frame Rate | ACT | BLANK | Frame Rate |
| Game | 1 | 0 | 120Hz | 1 | 1 | 1 | 60Hz | 1 | 3 | 30Hz | 1 | 11 | 10Hz | 1 | 23 | 5Hz |
| Video | 1 | 1 | 60Hz | 2 | 1 | 3 | 30Hz | 1 | 11 | 10Hz | 1 | 16 | 7Hz | 1 | 23 | 5Hz |
| Message | 1 | 3 | 30Hz | 4 | 1 | 11 | 10Hz | 1 | 16 | 7Hz | 1 | 20 | 6Hz | 1 | 23 | 5Hz |
| Web | 1 | 11 | 10Hz | 12 | 1 | 12 | 9Hz | 1 | 16 | 7Hz | 1 | 20 | 6Hz | 1 | 23 | 5Hz |

FIG. 10A

| Scenario | SEQ1 | | | Dimming Sequence | | | SEQ5 | | |
|---|---|---|---|---|---|---|---|---|---|
| | ACT | BLANK | Frame Rate | Target BLANK | Step of BLANK | | ACT | BLANK | Frame Rate |
| Dynamic Frame Rate | 1 | 3 | 30Hz | 23 | 2 | | 1 | 23 | 5Hz |

FIG. 11A

TIMING CONTROLLER HAVING MECHANISM FOR FRAME SYNCHRONIZATION, DISPLAY PANEL THEREOF, AND DISPLAY SYSTEM THEREOF

TECHNICAL FIELD

The disclosure is directed to a timing controller having a mechanism for frame synchronization, a display panel having the timing controller thereof, and a display system having the timing controller thereof.

BACKGROUND

Currently, many Organic Light Emitting Diode (OLED) display panels have incorporated a type of Low Temperature Polycrystalline Silicon (LTPS) Thin Film Transistor (TFT) technology as LTPS refers to the material of the OLED display substrate. Subsequently, a Low Temperature Polycrystalline Oxide (LTPO) layer has been added to the LTPS substrate to allow electrons to pass through the LTPS TFT with higher electron mobilities so as to reduce the energy needed to excite the pixel points. As the energy needed to excite pixel points has reduced, the overall power consumption of the display panel is lessened. However, the current OLED display panels under some circumstances may experience a reduction of its frame rate that is outside of its control under a conventional image displaying scheme.

SUMMARY OF THE DISCLOSURE

Accordingly, the disclosure is directed a timing controller having a mechanism for frame synchronization, a display panel having the timing controller thereof, and a display system having the timing controller thereof.

In an aspect, the disclosure is directed to an integrated circuit which includes not limited to a timing controller to transmit a first tearing (TE) signal to an application processor and receive a first image frame from the application processor after the application processor receives the first TE signal, and a control circuit to generate a first sync signal when the timing controller receives the first image frame, wherein when the application processor receives a second TE signal and the application processor is not ready to transmit a second image frame to the timing controller, the control circuit delays a first waiting period to generate a second sync signal.

In an aspect, the disclosure is directed to a display panel which includes not limited to a display including a pixel array for displaying images and an integrated circuit coupled to the display and including: a timing controller to transmit a first TE signal to an application processor and receive a first image frame from the application processor after the application processor receives the first TE signal, and a control circuit to generate a first sync signal when the timing controller receives the first image frame, wherein when the application processor receives a second TE signal and the application processor is not ready to transmit a second image frame to the timing controller, the control circuit delays a first waiting period to generate a second sync signal.

In an aspect, the disclosure is directed to a display system which includes not limited to an electronic device including a graphics control unit (GPU), and an application processor (AP) coupled to the GPU and configured to output a plurality of render images to a display panel, and the display panel including a display, and an integrated circuit coupled to the display and including: a timing controller to transmit a first TE signal to an application processor and receive a first image frame from the application processor after the application processor receives the first TE signal, and a control circuit to generate a first sync signal when the timing controller receives the first image frame, wherein when the application processor receives a second TE signal and the application processor is not ready to transmit a second image frame to the timing controller, the control circuit delays a first waiting period to generate a second sync signal.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also, the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 7 shows a table containing parameters of each skip sequences according to an exemplary embodiment of the disclosure.

FIG. 10A-FIG. 10C illustrates setting different wait times for different scenarios according to an exemplary embodiment of the disclosure.

FIGS. 11A and 11B illustrates dynamic adjustments of wait times according to an exemplary embodiment of the disclosure.

DETAILED DESCRIPTION OF DISCLOSED EMBODIMENTS

Figure 1:
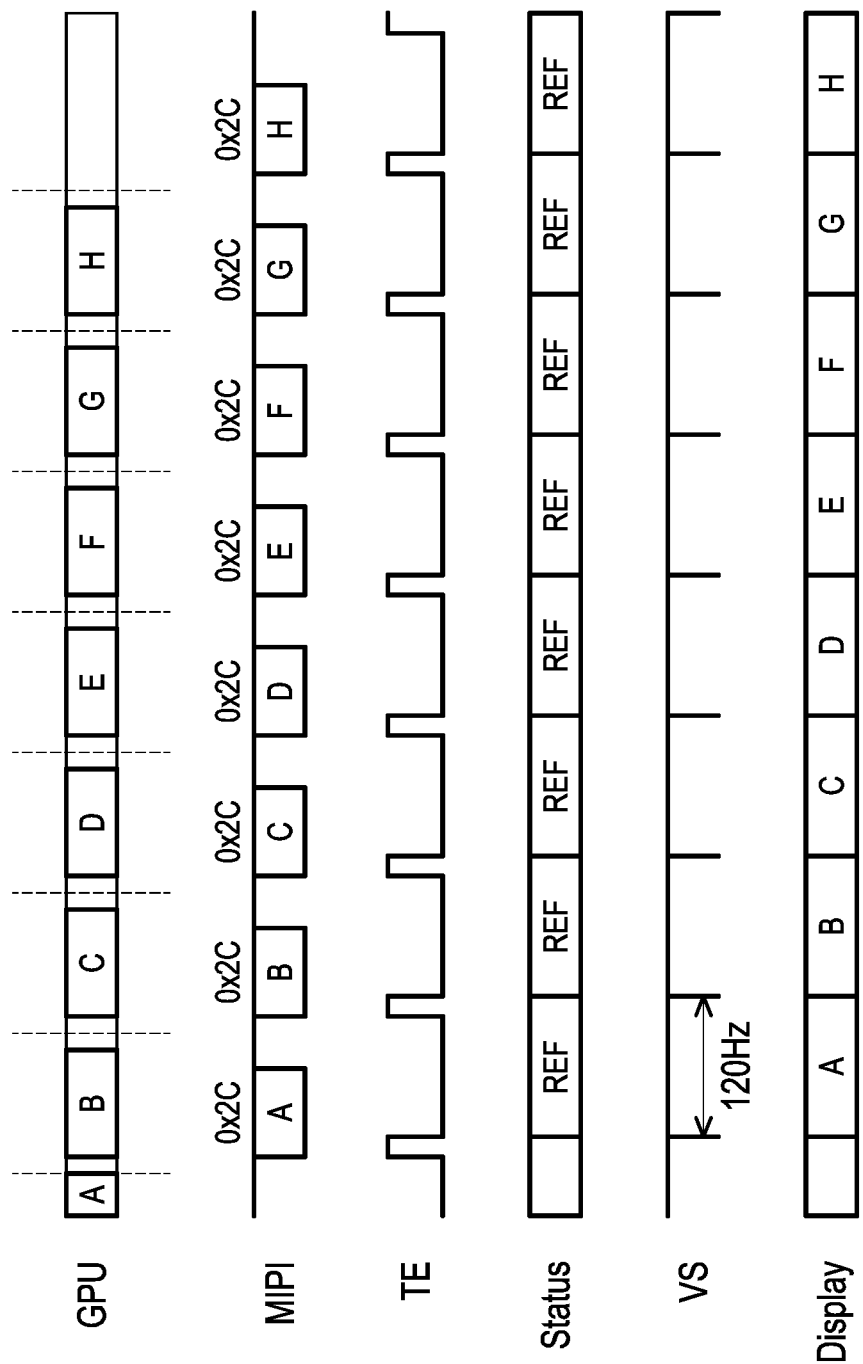
FIG. 1 illustrates a timing diagram which describes the timing of various signals for updating the images displayed on a display panel.

Reference will now be made in detail to the present exemplary embodiments of the disclosure, examples of which are illustrated in the accompanying drawings. Wherever possible, the same reference numbers are used in the drawings and the description to refer to the same or like parts.

FIG. 1 illustrates a timing diagram which describes the timing of various signals for updating the images displayed on a display panel. This disclosure provides Graphics GPU which renders image data corresponding to consecutive image frames (i.e. consecutive image frames for short) which are expected to be output as image frames A B C D E F G H at regular intervals, and then the consecutive image frames would be able to be displayed on a display panel at the same rate. However, the display panel may not be able to use the rendered images directly, and thus, the images transmitted from the GPU may require a transformation or an adjustment of timing or format before the image could be displayed on the display panel.

In the example of FIG. 1, each of the consecutive image frames are converted into a format compatible with the Mobile Industry Processor Interface (MIPI) standard before being displayed on a display panel. It is also assumed that it requires the time of one frame to convert the images from the GPU into the MIPI format. When the GPU is able to continuously send images without significant delays, the display panel would typically be able to maintain the same frame rate as the rendered images transmitted by the GPU. For example, if the frame rate of the images sent by the GPU is at 120 Hz, then frame rate of the images being shown by a display panel would also be 120 Hz with a one frame delay.

Figure 2:
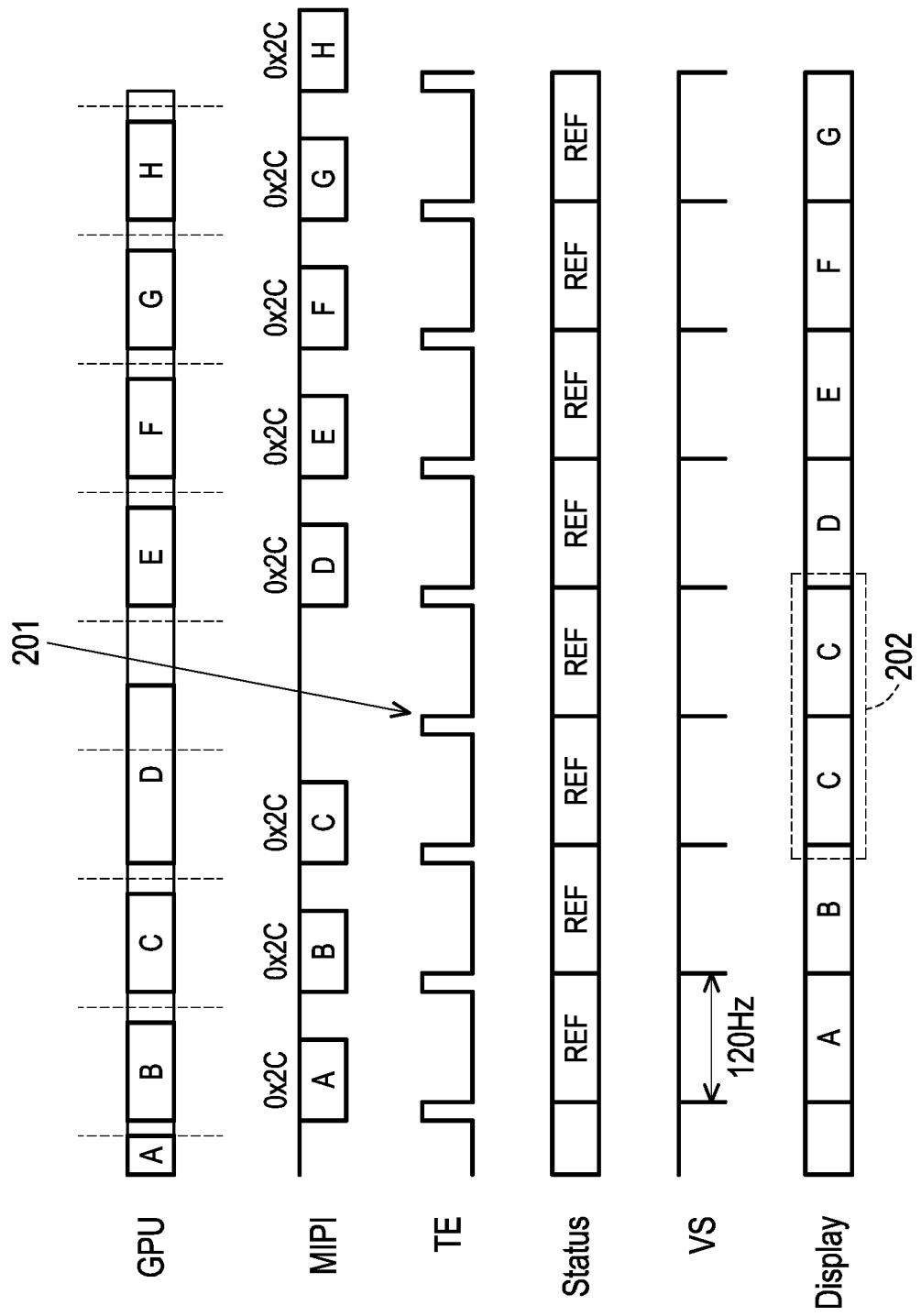
FIG. 2 illustrates a timing diagram serves to explain a cause for a decreased frame rate.

However, while the GPU is continuously sending images, any delay related to the processing or the delivery of the images may reduce the frame rate of the images being displayed on the display panel relative to the original frame rate of the GPU. For example, referring to FIG. 2, the image frames are typically expected at regular intervals matching the frame rate of the GPU. Conventionally, when the GPU is ready to transmit an image, the display panel would receive a video synchronization (VSync) signal which typically occur at regular intervals. However, if the image frame D as shown in FIG. 2 is not yet ready when the Tearing (TE) signal 201 is sent from the display panel to signal the end of the display of the current frame at which the next VSync signal is expected, then it may cause the so-called "tearing effect" which occurs when a video has missing frames or when a frame has missing lines. The tearing effect is generally seen as incongruency in the on-going video caused by gaps between image frames or missing lines. In order to avoid the tearing effect, the display panel may display the same image frame C 202 for two consecutive time frames. In other words, when there is no image update after VSync signal has been received or when no VSync signal is received when one is expected, the image frame that is most recently displayed by the display panel could be repeated for the duration of one frame.

Consequently, whenever the above-described problem occurs, the frame rate could be temporarily reduced in half or more relative to the original frequency. For example, assuming that the frame rate of the images delivered from the GPU has been at 120 Hz, the frame rate is reduced to 60 Hz if the GPU could not finish rendering image frame D on time. Therefore, under a conventional scheme, there could be a noticeable drop of frame rates whenever there is a delay related to the rendering or the processing of images.

Figure 3:
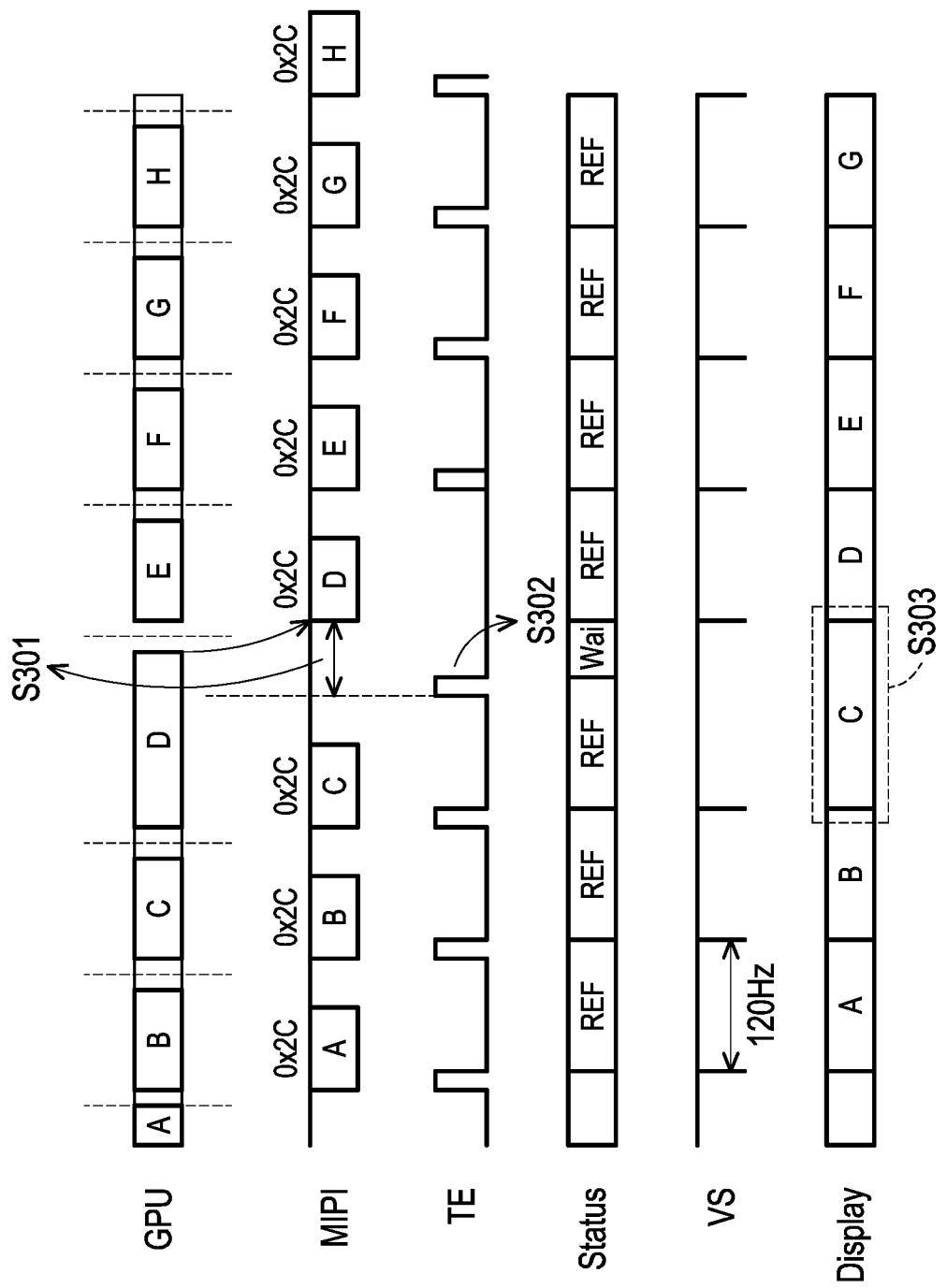
FIG. 3 illustrates a timing diagram which serves to explain an inventive concept of the disclosure.

One of the inventive concepts of the disclosure is described in the timing diagram shown in FIG. 3 and its corresponding written descriptions. As seen in FIG. 3, the GPU is assumed to transmit consecutive image frames A B C D E F G H which are to be displayed on a display device such as a display monitor, a display panel, a touch screen, and etc. These image frames may or may not be directly or readily interfaced with the display panel. Assuming that these image frames may not directly or readily be interfaced with the display panel, an AP could be utilized to perform a processing or transformation of these image frames so that these image frames could be received and displayed by the display panel. In this disclosure, the AP is assumed to perform a transformation from the image frame data received from a GPU into image frames under the MIPI format. However, the disclosure does not limit the processing of the AP to any particular format. As seen in FIG. 3, the processed images frames under MIPI format may lag the image frames transmitted from the GPU by one frame.

In general, after the AP first sends an image frame to the display panel to be displayed, the display panel upon receiving the image frame would start to output or refresh the image frame line by line, typically from top to bottom, until the very last line has been finished. When the update of the image frame has been completed or nearly completed, the display driver integrated circuit (DDIC) may send a TE signal 301 to the AP to indicate to the AP that the update of the current image frame has been completed so that the display panel is ready to receive another image frame from the AP. If the self-refresh rate of the display panel is 60 Hz, then theoretically the frequency of the TE signal measured from the output pin of the TE signal is also at 60 Hz. After transmitting the next image frame, the next image frame could be stored in a video buffer or random-access memory (RAM) to be fetched by a timing controller. The timing controller's main function is to convert from image frame output from the AP into a format that is compatible with the display drivers for driving the pixel arrays on a display panel.

However, it is quite possible that a delay may occur in the rendering of images by the GPU or other reasons. For example, after the TE signal 301 has been transmitted, the image frame D is immediately expected. However, upon detecting that the image frame D is not being received, the timing controller imposes a wait time 302 before fetching the image frame data stored in the video buffer or RAM in order to process the image frame data. In the example of FIG. 3, there is a delay 303 between when image frame D is expected and when the image frame D is actually transmitted, and the timing controller would impose a wait time 302 to account for the delay 303. The AP may output the image frame D before the wait time 302 has expired. Before the expiration of the wait time, the display panel may continue to display image frame C. However, since the wait time is less than the duration of one image frame or may even be configured to be significantly less than the duration of one image frame, the drop of the instantaneous frame rate might not be significant or observable by the human eyes. Upon the expiration of the wait time, the timing controller may generate a video synchronization signal (VSync) signal 305 for the display panel to start display image frame D.

It is worth noting that one difference from an unrelated frame synchronization mechanism is that the GPU or AP may transmit a VSync signal to signal the start of an image frame, or a DDIC may transmit a VSync signal periodically. But for this disclosure, the VSync signal is generated by the DDIC at a specific frame to signal the start of an image frame to be displayed. Another difference is that the negative impact of the frame rate due to the delay of the GPU or AP is reduced since the timing controller may impose a (slight) delay (e.g. the wait time 302) before starting to process the next image frame. The transmission of VSync by TCON 401 of the DDIC may increase the period of a frame due to the wait time (e.g. 302). When an image transmitted from the AP or when the image is received at the end of the wait time (e.g. 302), the VSync could be generated to signal an end of a frame n so as to start a next frame n+1.

Figure 4:
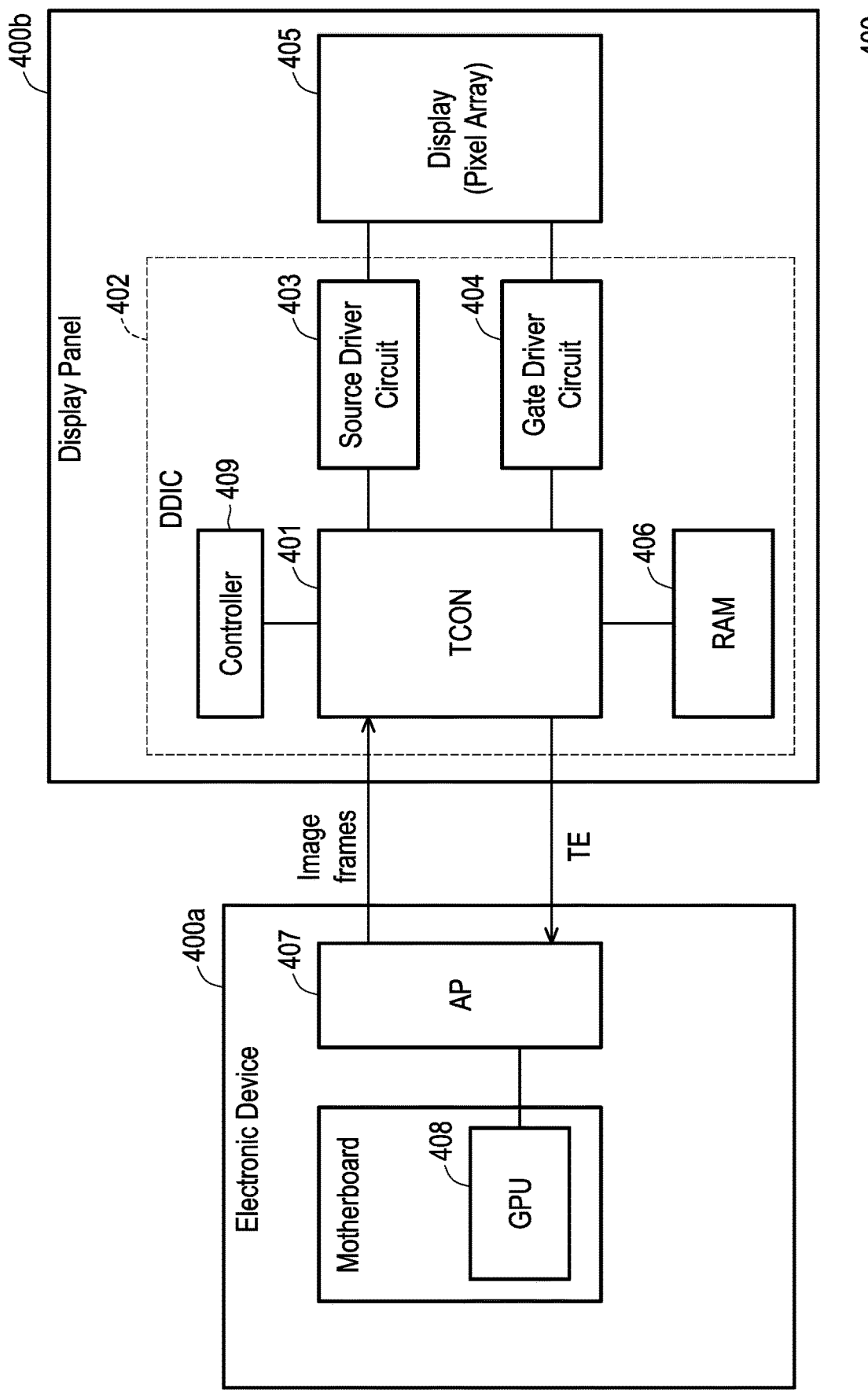
FIG. 4 illustrates a hardware block diagram of a display system according to an exemplary embodiment of the disclosure.

In order to implement the inventive concept described above, the disclosure provides an integrated circuit (e.g. 402), a display panel (e.g. 400b) which includes the integrated circuit (e.g. 402), and a display system (e.g. 400) which includes the display panel (e.g. 400b). FIG. 4 shows the hardware block diagram of the overall display system 400. The display system 400 includes an electronic device 400a and a display panel 400. It should be noted that the electronic device 400a and the display panel 400b are integrated or packaged as one device or as two difference devices, and it should be apparent to a person skilled in the art that the disclosure could be applicable to either configurations. For example, the electronic device 400a is be a smart phone or a laptop or a tablet or other types of devices, and the display panel 400b is touch screen which is a part of the smart phone or the laptop or the laptop or etc. Alternatively, the electronic device 400a is, for example, a personal computer (PC), and the display panel 400b is a liquid crystal display (LCD) panel which is separately packaged from the PC.

The electronic device 400a includes not limited to a GPU 408. The GPU 408 outputs image data corresponding to image frames (i.e. image frames for short) to be received by the AP 407. The AP 407 is an optional device which is required or not required depending on whether the image data output by the GPU 408 could be readily received by the display panel 400b.

When the AP 407 is not required, the GPU 408 transmits the image data corresponding to image frames directly to the display panel 400b. Assuming that the AP 407 is required, the main function of the AP 407 is to transform or convert the image data corresponding to image frames into a format which could be understood or friendly to the display panel 400b. In this disclosure, the AP 407 is described as to transform or convert the image data corresponding to image frames into the MIPI format as an example, but it should be apparent to a person skilled in the art that the inventive concept would still be applicable if the AP 407 transforms to the image data corresponding to image frames into another format.

Upon the AP 407 transmitting image frames, the image frames is received by a video buffer or RAM 406 which could be an optional component of the display panel 400b or directly by a timing controller (TCON) 401 which could be a part of a DDIC 402. After the TCON 401 transmitting the TE signal to indicate an end or being near an end of an image frame being refreshed on the pixel array 405, the DDIC 402 determines whether the next image frame is being received. For example, the TCON 401 accesses the RAM 406 to determine whether the next image frame is being received. Upon receiving the next image frame, the TCON 401 generates a VSync to indicate to the display drivers (e.g. 403 404) to refresh from the beginning of the lines on the pixel array 405. The main function of the TCON 401 is to convert from the received image data of the image frames into a format that is compatible with the signal format of the source driver circuit 403 and the gate driver circuit 404. The main function of the source driver circuit 403 and the gate driver circuit 404 is to drive the pixel array (i.e. the display panel). It is worth noting that the RAM 406, the TCON 401, the source driver circuit 403 and the gate driver circuit 404 could be integrated as one chip or could be integrated as multiple chips. The disclosure does not limit the exact configuration herein.

Figure 5:
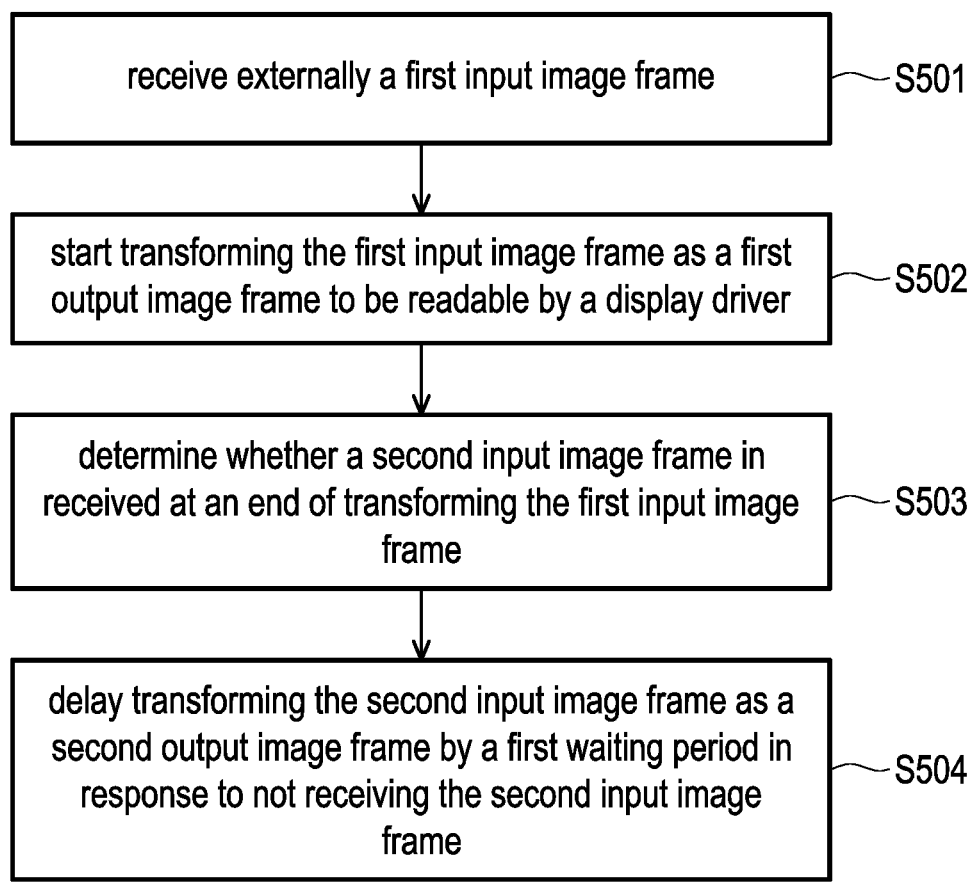
FIG. 5 illustrates a flow chart which describes a frame synchronization mechanism that involves multiple display modes according to an exemplary embodiment of the disclosure.

The disclosure provides an integrated circuit (e.g. DDIC 402) for implementing the frame synchronization mechanism, and the functions of the integrated circuit is summarized in FIG. 5. In step S501, the integrated circuit may receive externally a first input image frame. In step S502, the integrated circuit may start transforming the first input image frame as a first output image frame to be displayable by a display. In step S503, the integrated circuit may determine whether a second input image frame is received at an end of transforming the first input image frame. In step S504, the integrated circuit may delay transforming the second input image frame as a second output image frame by waiting for a first waiting period in response to the second input image frame not being ready.

For an example, an integrated circuit transmits a first TE signal (e.g. S1201) to an application processor and receive a first image frame (e.g. "D", FIG. 12) from the application processor after the application processor receives the first TE signal. Next, the integrated circuit generates a first sync signal (e.g. S1202) when the timing controller receives the first image frame (e.g. "D"), wherein when the application processor receives a second TE signal (e.g. S1203) and the application processor is not ready to transmit a second image frame (e.g. "IDLE, FIG. 12) to the timing controller, the control circuit delays a first waiting period to generate a second sync signal (e.g. S1204). Assuming that the refresh rate is 120 Hz, the first waiting period may result a reduced refresh rate as, for example, 80 Hz.

According to an exemplary embodiment, the integrated circuit transmits a third TE signal to an application processor and receive a third image frame (e.g. "F", FIG. 12) from the application processor after the application processor receives the third TE signal, and the control circuit further to generate a third sync signal when the timing controller receives the third image frame, wherein when the application processor receives a fourth TE signal, the control circuit further to generate a fourth sync signal, and a first interval between the first sync signal and the second sync signal is different from a second interval between the third sync signal and the fourth sync signal. It should be noted that there is no waiting period necessary for the reception of the third image frame (e.g. "F", FIG. 12) while there was a waiting period for the reception of the second image frame. Therefore, the interval between the first sync and the second sync signal is longer than the interval between the third sync signal and the fourth sync signal.

According to an alternative embodiment, when the application processor receives the fourth TE signal (e.g. S1205), the application processor is not ready to transmit a fourth image frame (e.g. IDLE) to the timing controller, and the control circuit further generates the fourth sync signal by delaying a second waiting period to generate the fourth sync signal, and the first waiting period is different from the second waiting period. Due to the waiting period, the frame rate is reduced to, for example, 96 Hz.

Figure 6A:
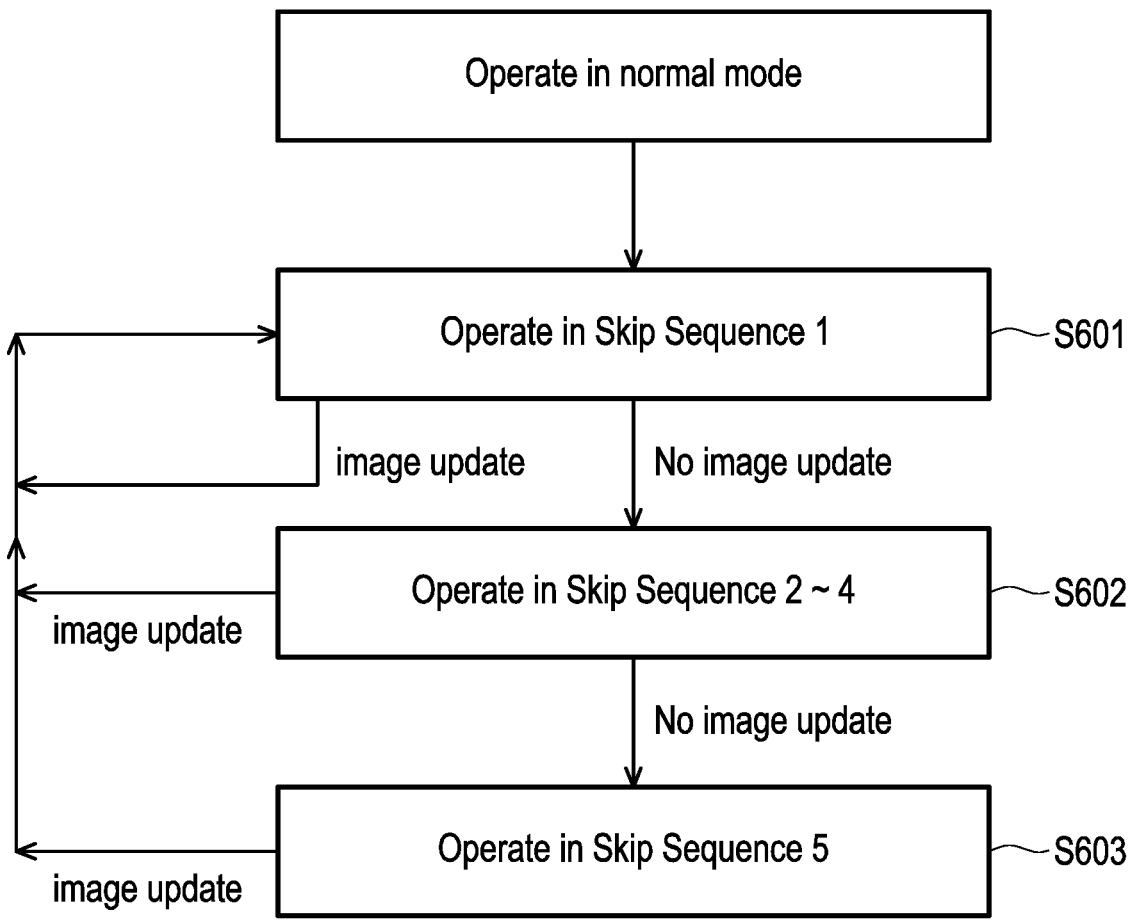
FIGS. 6A and 6B are flow charts which illustrates switching among different skip sequences according to an exemplary embodiment of the disclosure.
Figure 6B:
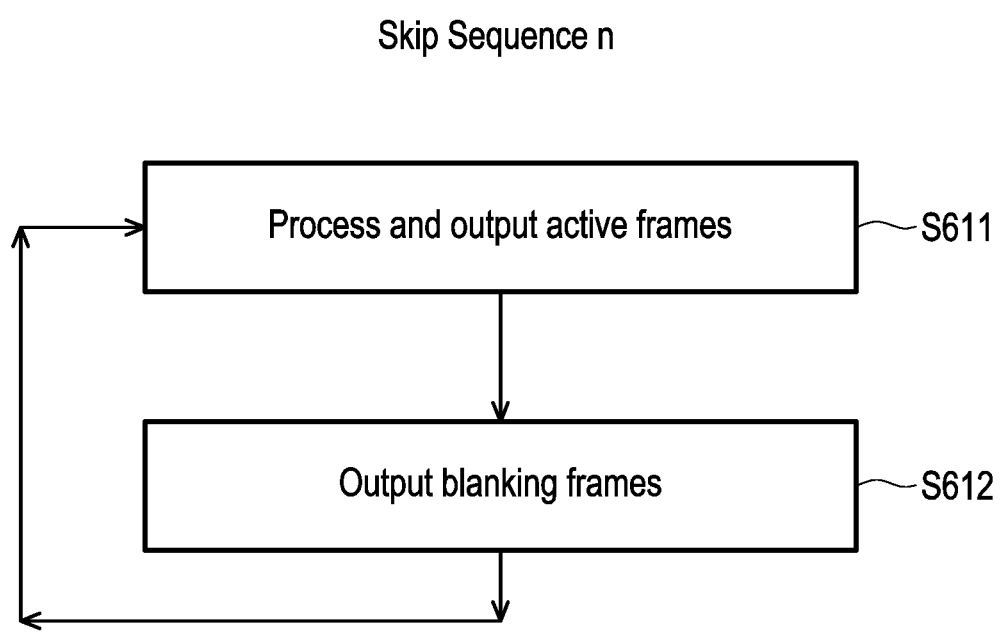

In this disclosure, the display system (e.g. 400) may switch among different display modes or different display sequences to adjust the frame rate based on a ratio between an active frame and blanking frames. FIGS. 6A and 6B are flow charts which shows the process of switching among different skip sequences. Skip sequence 1 has the highest ratio of an active frame and blanking frames, skip sequence 2 has the next highest ratio, and so forth, and skip sequence 5 has the lowest ratio of an active frame and blanking frames. In should be noted that FIGS. 6A and 6B merely serve as an example, and the disclosure is not limited to a particular number of skip sequences. Referring to FIG. 6A, the display system (e.g. 400) is assumed to operate in a normal mode. In step S601, the display system is assumed to have switched to skip sequence 1, and a counter will start and will increment for each frame being received. If there is an image update (i.e. new image frame being received) before the counter reaches a first predetermined number, then the display system will remain in skip sequence 1 and reset the counter. If there is no image update after the counter reaches the first predetermined number which means that there is no image update after several consecutive frames, the display system will switch to skip sequence 2 and reset the counter.

In step S602, the display system is assumed to have switched to skip sequence 2, and a counter will start and will increment for each frame being received. If there is an image update (i.e. new image frame being received) before the counter reaches a second predetermined number which is larger than the first predetermined number, then the display system will switch to skip sequence 1 and reset the counter. If there is no image update after the counter reaches the second predetermined number, the display system will switch to skip sequence 3 and reset the counter. The same procedure would repeat while the display system operates under skip sequence 3 and skip sequence 4. In step S603, the display system is assumed to have switched to the last skip sequence (e.g. skip sequence 5), and a counter will start and will increment for each frame being received. If there is an image update before the counter reaches a predetermined number which is the largest among all the counters, then the display system will switch to the skip sequence 1 and reset the counter. If there is no image update after the counter reaches the predetermined number, the display system will remain in the last skip sequence and reset the counter.

Referring to FIG. 6B, for each skip sequence, the display system is assumed to display a first predefined number of active frames and a second predefined number of inactive frames. The first predefined number is an integer which is at least 1 and most often 1, and the second predetermined number is an integer which is one or more. The second predefined number is equal to or larger than the first predefined number. In step S611, the display system may display a specific number of active frames matching the first predefined number by using the same counter technique as FIG. 6A. In step S612, the display system may display a specific number of blanking frames matching the second predefined number by using the same counter technique as FIG. 6A.

The procedures of FIGS. 6A and 6B is clearer in view of FIG. 7 which shows a table containing parameters of each of the skip sequences. Each of the skip sequences may have a different ratio between an active frame and blanking frames depending on which scenario the display system is operating under. As shown in FIG. 7, for the first skip sequence (SEQ1) assuming that a user is playing a video game and thus the scenario is "Game", there is one active frame followed by 0 blanking frame. Since the frame rate is 120 Hz, there is two active frame being displayed per second. Assuming that a user is watching a video, the scenario is "Video" under which an active frame is assumed to be followed by a blanking frame, and thus the frame rate is reduced to 60 Hz. Assuming that a user is using a web browser with no video being displayed, the scenario is "Web" under which an active frame is assumed to be followed by 11 blanking frame, and thus the frame rate is reduced to 11 Hz. Therefore, while a user is playing video game, the image frame is constantly being updated, and the image frame is updated a lot less frequently while the user is browsing the web. However, when the image is not being updated or very slowly updated, the skip sequences would slowly gravitate toward the last skip sequence from SEQ1 to SEQ2 to SEQ 3 to SEQ 4 to SEQ 5. When the image is not being updated at all, the display system would operate in SEQ5.

Figure 8:
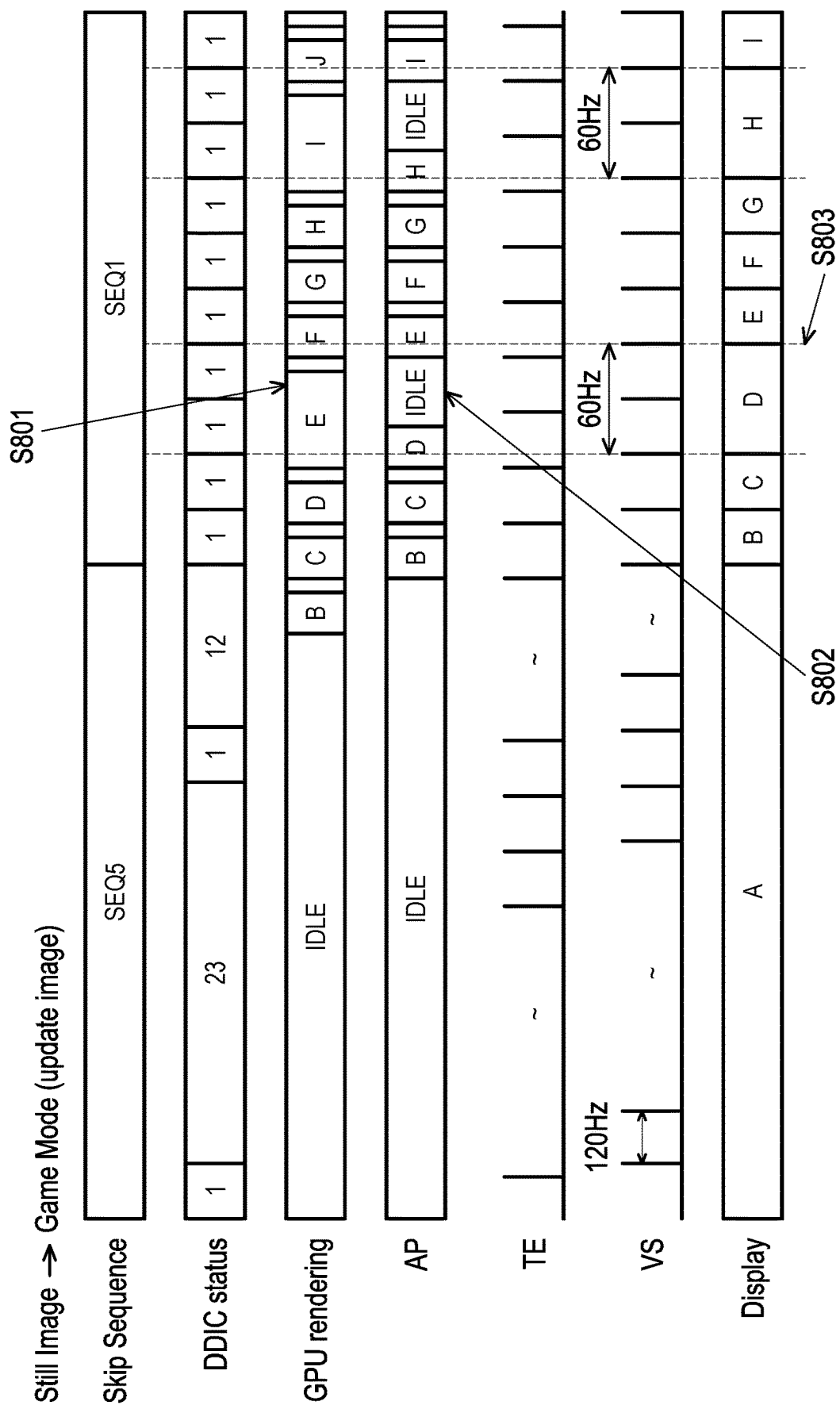
FIG. 8 illustrates a timing diagram of a mechanism for avoiding tearing effect according to an exemplary embodiment of the disclosure.

FIG. 8 shows a timing diagram serves to explain a mechanism of the disclosure which attempts to avoid the tearing effect without the use of wait time while trying operating under Game mode in SEQ1. At the TE signal S802 which indicates the end or near the end of image frame D being refreshed in the display panel, the image frame E is being expected. However, in this example, it is assumed that the CPU does not finish rending picture frame E S801, and thus while the TE signal S802 is received by the AP, the AP is being idle and is not transmitting any image frame. In this particular example, the Sync signal is transmitted to the display panel to synchronize with the display by indicating a start of the next image frame. Assuming that the Sync signal is transmitted at a regular basis, the display panel has to keep displaying image frame D until the occurrence of the Sync signal S803 at which the rendering of image frame E has been finished by the GPU and the AP is transmitting image frame E. Since the image frame D has been displayed for the duration of two consecutive frames in this example, the frame rate would be halved from 120 Hz to 60 Hz.

Figure 9A:
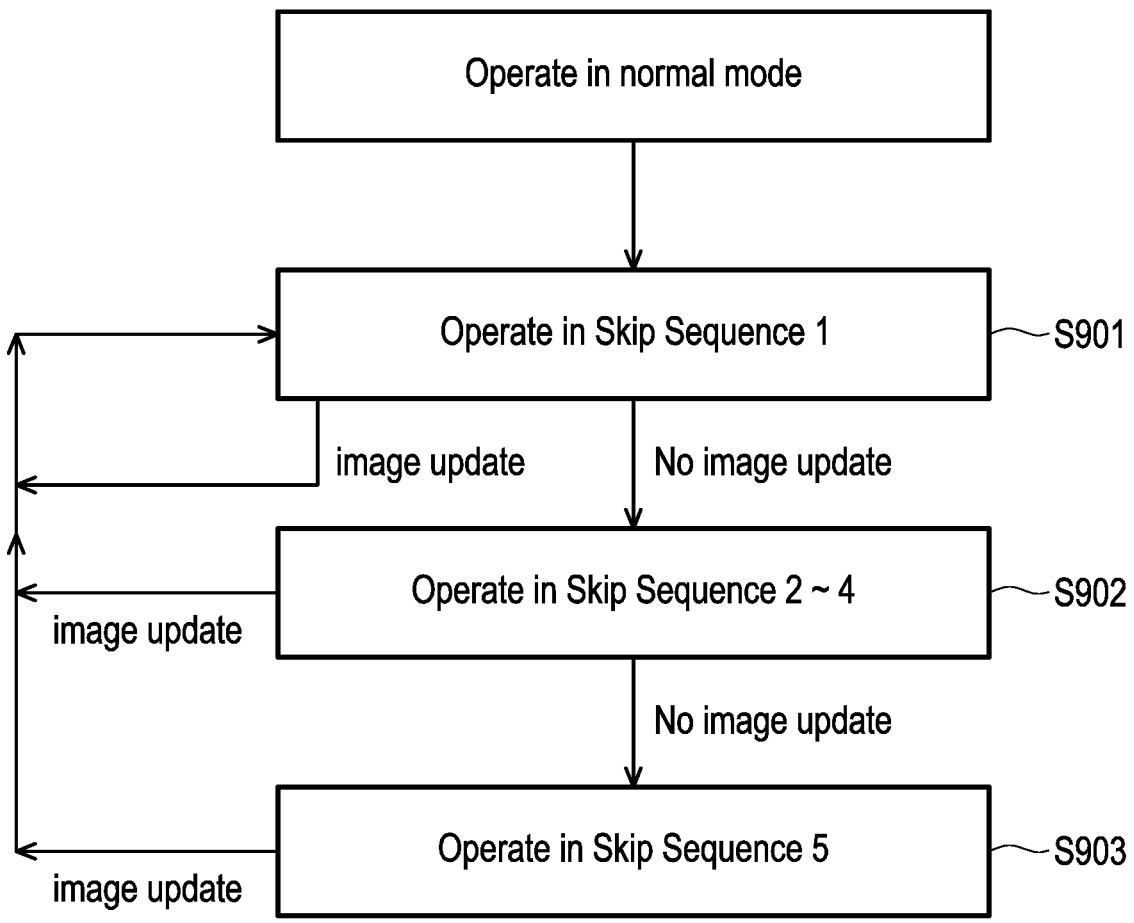
FIGS. 9A and 9B are flow charts which illustrates a mechanism of wait time while switching among different skip sequences according to an exemplary embodiment of the disclosure.
Figure 9B:
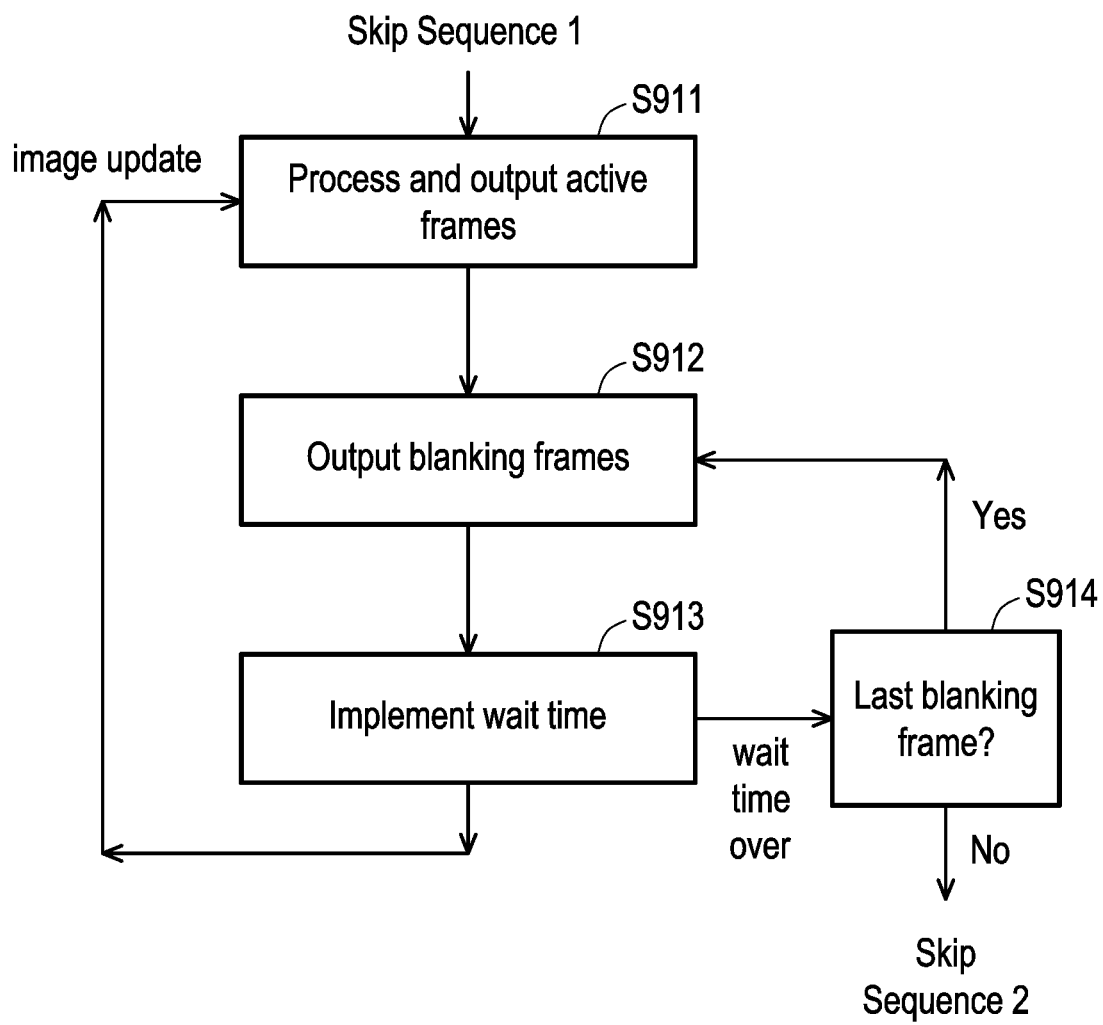

FIGS. 9A and 9B are flow charts which introduces the concept of wait time from FIG. 3 into the technique of switching among different skip sequences as described in FIGS. 6A and 6B. The technique of FIG. 9A and FIG. 9B would improve the frame rate performance under the technique of FIG. 8. Referring to FIG. 9A, the display system (e.g. 400) is assumed to operate in a normal mode. In step S901, the display system is assumed to have switched to skip sequence 1, and a counter will start and will increment for each frame being received. If there is an image update before the counter reaches a first predetermined number, then the display system will remain in skip sequence 1 and reset the counter. If there is no image update after the counter reaches the first predetermined number, the display system will switch to skip sequence 2 and reset the counter.

In step S902, the display system is assumed to have switched to skip sequence 2, and a counter will start and will increment for each frame being received. If there is an image update before the counter reaches a second predetermined number which is larger than the first predetermined number, then the display system will switch to skip sequence 1 and reset the counter. If there is no image update after the counter reaches the second predetermined number, the display system will switch to skip sequence 3 and reset the counter. While operating under skip sequence 3, if there is an image update before the counter reaches a third predetermined number which is larger than the second predetermined number, then the display system will switch to back to skip sequence 1 and reset the counter. If there is no image update after the counter reaches the third predetermined number, the display system will switch to skip sequence 4 and reset the counter. While operating under skip sequence 4, if there is an image update before the counter reaches a fourth predetermined number which is larger than the third predetermined number, then the display system will switch back to skip sequence 1 and reset the counter. If there is no image update after the counter reaches the fourth predetermined number, the display system will switch to skip sequence 5 and reset the counter.

In step S903, the display system is assumed to have switched to the last skip sequence, and a counter will start and will increment for each frame being received. If there is an image update before the counter reaches a predetermined number which is the largest among all the counters, then the display system will switch to the skip sequence 1 and reset the counter. If there is no image update after the counter reaches the predetermined number, the display system will remain in the last skip sequence and reset the counter.

Referring to FIG. 9B which shows the display system operating in the first skip sequence, the display system displays an active frame and a predefined number of inactive frames based on the scenarios described in FIG. 7. In step S911, the display system may display one or more active frames. In step S912, the display system may display a specific number of blanking frames matching the predefined number based on the scenarios described in FIG. 7. In step S913, the timing controller may implement a wait time before processing the next image frame stored in a video buffer or RAM by using the same counter technique as previously described. The process can repeat at S911 before the wait time has expired if there is an image update. In this exemplary embodiment, the wait time could be cut short if the AP sends the next image frame before the counter has expired. The process can also proceed from step S914 after the counter has expired as there is no image update during the full duration of the timer. At step S914, if there is no image update after the counter has expired, the process moves from skip sequence 1 to skip sequence 2; otherwise, the process proceeds from step S912.

It is worth noting that the wait time would only be applicable to the first skip sequence and not applicable to other skip sequences. The wait time is not included as a part of the blanking frame but instead follows the blanking frame. Referring to FIG. 10A, for the scenario of 'Game', there could be a wait time of less than one frame. Similarly, for the scenario of 'Video", there is one active frame followed by one inactive frame. Two periods of wait time may follow the inactive frame and thus a maximum of three idle frames may follow the active frame. Similarly, for the scenario of 'Web", after one active frame, 12 periods of wait time could be implemented after the default 11 inactive frames of FIG. 7, and thus the maximum idle time after the active frame would be 23 frames. In this exemplary embodiment, the start of the counting of the wait time is from the end of the last blanking frame.

Figure 10B:
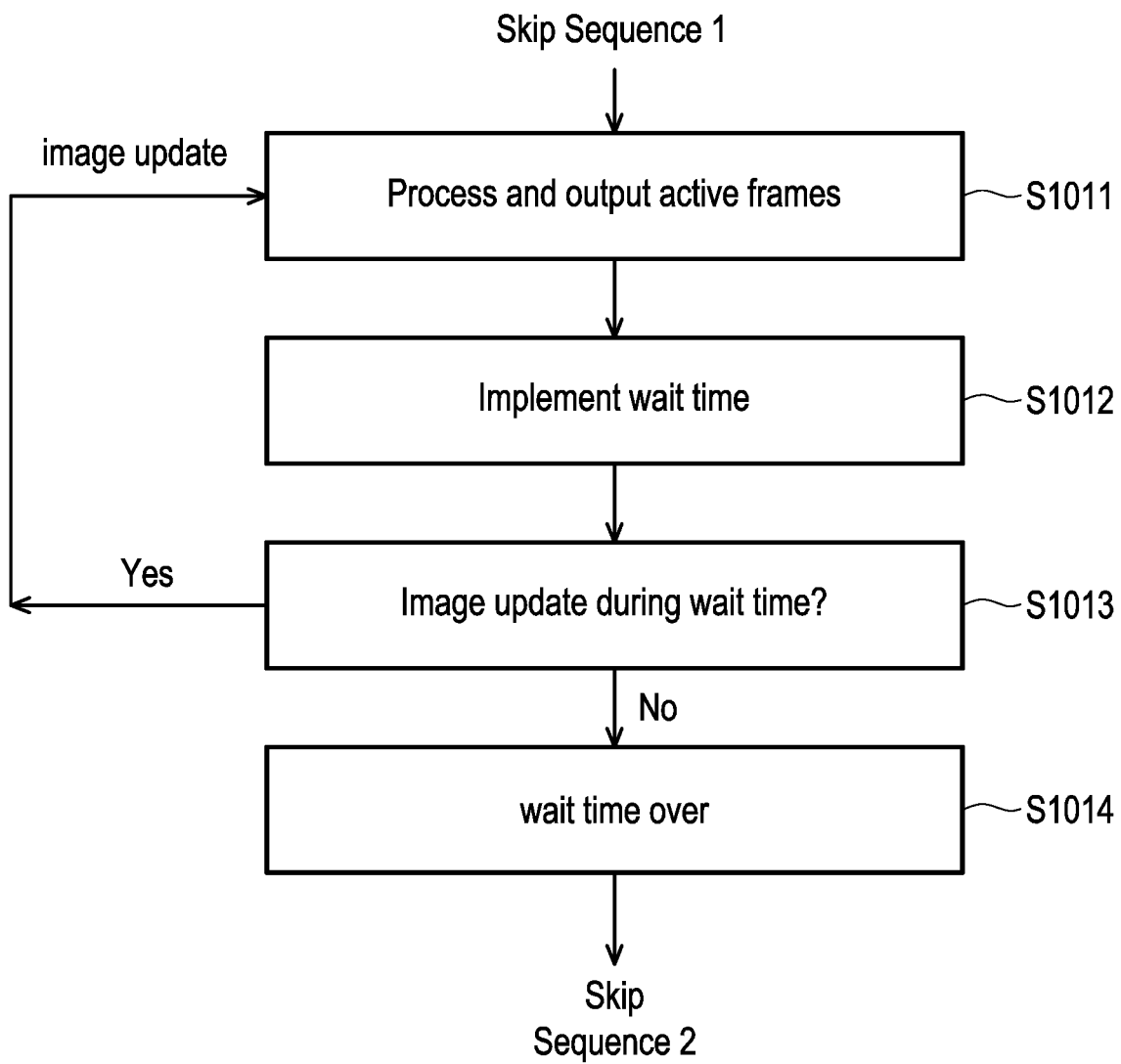

Referring to FIG. 10B which shows the implementation of wait time under game mode of skip sequence 1. In step S1011, the timing controller may process and subsequently output an active frame. In step S1012, the timing controller may implement a wait time and start a wait time counter. In step S1013, the display panel may determine if there is an image update during the wait time and if the wait time counter has expired. The process may proceed at step S1011 if there is an image update before the wait time counter has expired. If there is no image update and the wait time counter has expired (i.e. reached the preset number), the process may move to skip sequence 2. The wait time counter could also be dynamically adjusted so as to adjust the duration of the wait time.

Figure 10C:
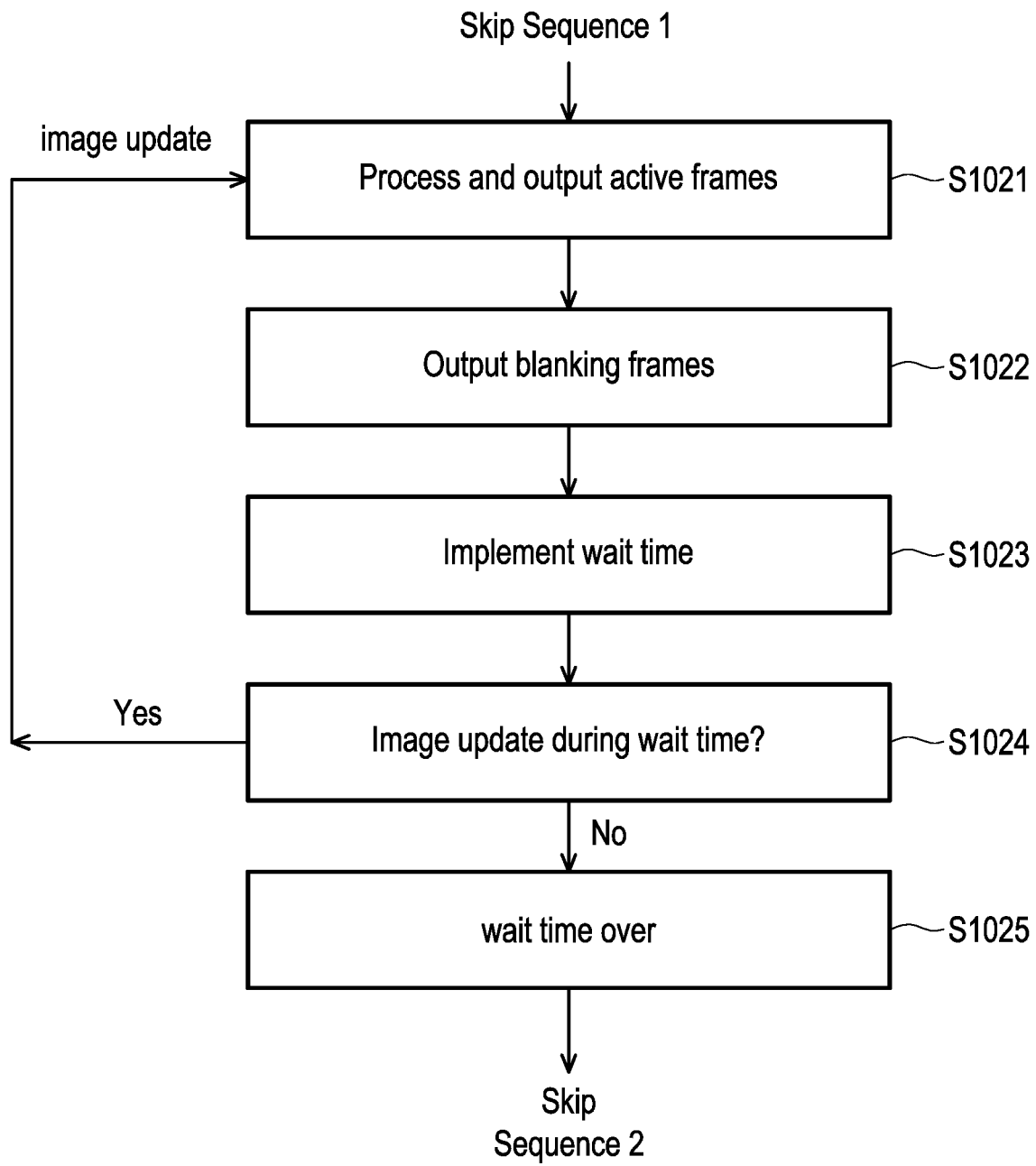

Referring to FIG. 10C which shows the implementation of wait time under video mode or message mode or web mode of skip sequence 1. In step S1021, the timing controller may process and subsequently output an active frame. In step S1022, the timing controller may process and subsequently output the corresponding number of blanking frames based on the table of FIG. 10A. In step S1023, the timing controller may implement a wait time and may start a wait time counter. In step S1024, the display panel may determine if there is an image update during the wait time and if the wait time counter has expired. The process may proceed at step S1021 if there is an image update before the wait time counter has expired. Also, the process may proceed at step S1025 if there is no image update but the wait time counter has expired (i.e. reached the preset number). Similar to FIG. 10B, the wait time counter could also be dynamically adjusted so as to adjust the duration of the wait time.

Figure 11B:
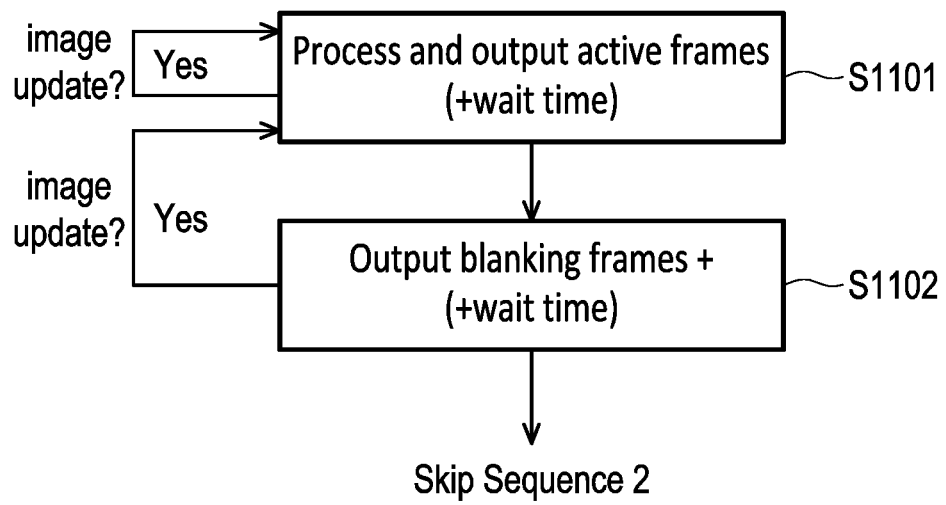

FIGS. 11A and 11B and their corresponding written descriptions disclose an implementation of varying wait time. Normally, the implementation of wait time would occur toward the end of the blanking frames. For example, when operating under message mode in skip sequence 1 as shown in the table of FIG. 11A, the implementation of wait time would occur immediately after 3 blanking frames. However, for the exemplary embodiment of FIGS. 11A and 11B, the wait time does not have to occur at the end of the blanking frames but instead may occur between the active frame and the blank frame or may occur between any of the two blanking frames. Also, for this embodiment, the DDIC may detect the current frame rate of the AP and automatically determine the location of the wait time. Alternatively, the AP may manually designate the location of the wait time on behalf of the DDIC.

Referring to FIG. 11B which describe the procedure of the embodiment of varying wait time. In step S1101, when operating in the first skip sequence, the timing controller would process an active frame and may subsequently implement a wait time according to a duration defined by a wait time counter if the wait time has been assigned in this location. In other words, one or more wait time period could be assigned right after the output of an active frame. In step S1102, the timing controller may output blanking frames. Alternatively, the wait time could be implemented in step S1102 instead of S1101 if the wait time has been assigned after an output of a blanking frame. Moreover, if there is an image update in step S1101, the procedure may proceed once again from S1101. If there is no image update in step S1101, then step S1102 is implemented. Similarly, in step S1102, if there is an image update, the procedure may proceed from step S1101; otherwise, if there is no image updated in step S1102, the procedure may proceed to Skip Sequence 2. For the exemplary embodiment of FIG. 11B, the wait time could be implemented either after the output of active frames or after the output of blanking frames. If there is an image update during either step S1101 or S1102, the procedure would proceed from step S1101. Otherwise, after step S1102 has been executed, the video display may change from Skip Sequence 1 to Skip Sequence 2.

Figure 12:
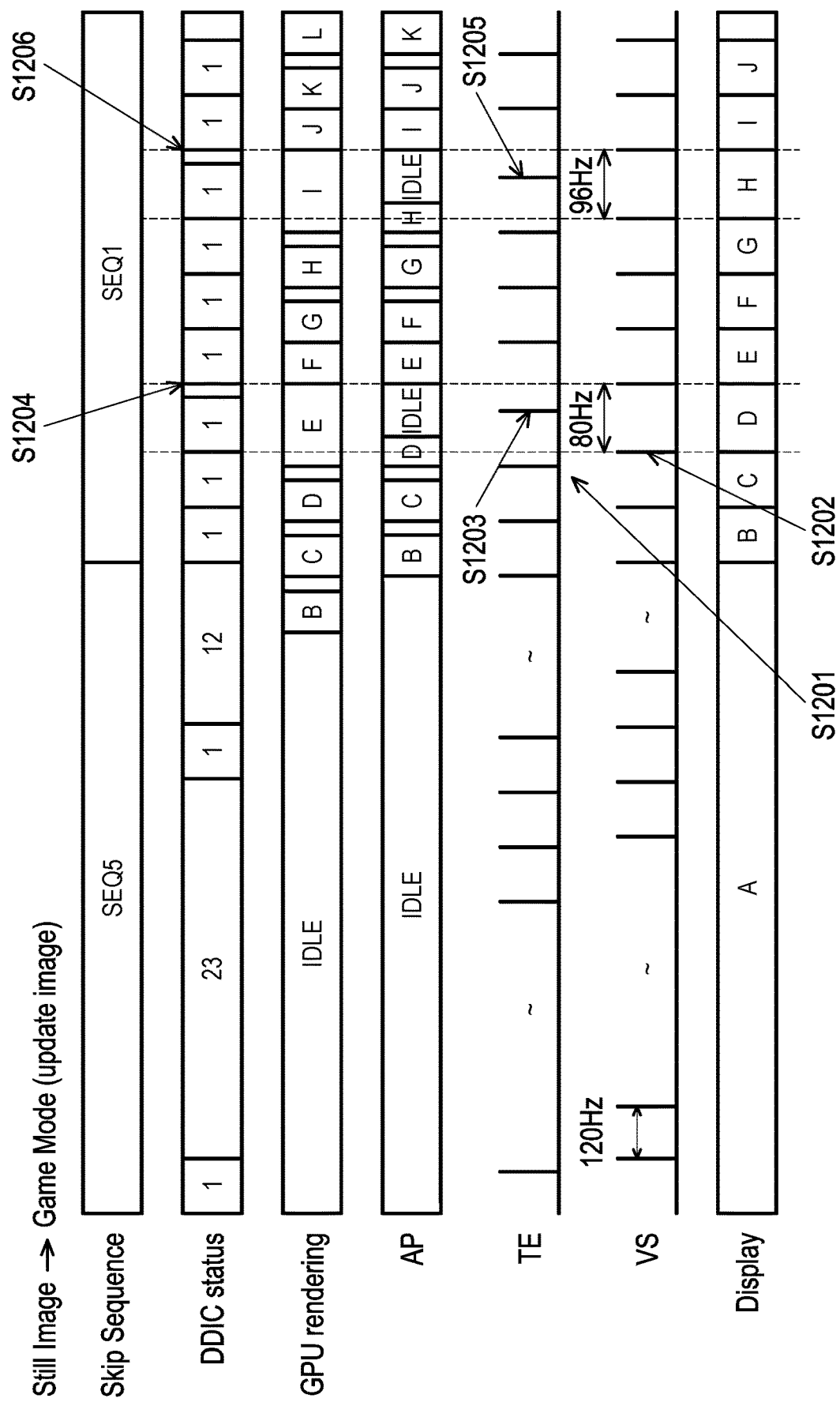
FIG. 12 is a timing diagram for displaying images during game mode by implementing the mechanism of frame synchronization according to an exemplary embodiment of the disclosure.

FIG. 12 is an example for displaying active images mixed with still images during game mode by implementing the above described mechanism of frame synchronization. At S1201, the timing controller would send a TE signal to the AP to indicate that the display of the current frame which is frame C is at completion or near completion. In response to receiving the TE signal, the AP may send the next image frame which is image frame D to the timing controller. Upon detecting the image frame D, the timing controller may transmit a first VSync at S1202 signal to the display driver to synchronize the update of the display to the first line of the display. As the timing controller has transmitted the first VSync signal, the display panel would start displaying image frame D. However, the GPU does not finish rendering image frame E at the very next TE signal at S1203 and thus the timing controller within the DDIC would implement a first wait time until S1204. The duration of the first wait time could be defined as from the very next TE signal which is at S1203 until the end of wait time which is at S1204. At S1204, the image frame E has been ready and is being delivered from the AP to the timing controller. Upon detecting the reception of the image frame E, the timing controller would transmit a second VSync signal to the display driver to synchronize the beginning of the image frame E. Because of the delay of image frame E, the first wait time is implemented which results in the reduction of instantaneous frame rate to 80 Hz.

Next, in this example, notice that the image frame I is not ready when another TE signal has been sent by the timing controller at S1205. As the image frame I is not ready, the timing controller would implement the second wait time until the image frame I is being sent from the AP at S1206. Due to the delay of the process of image frame I, the image frame H is displayed longer than one frame due to the second wait time, and the instantaneous frame rate is reduced to 96 Hz. It is worth noting that the duration of the first wait time and the second wait time are different. Also, as the result of the first wait time and the second wait time, even though there is still a reduction of the instantaneous frame rate, the reduction of the frame rate is still above 60 Hz and is thus effectively mitigated.

Figure 13A:
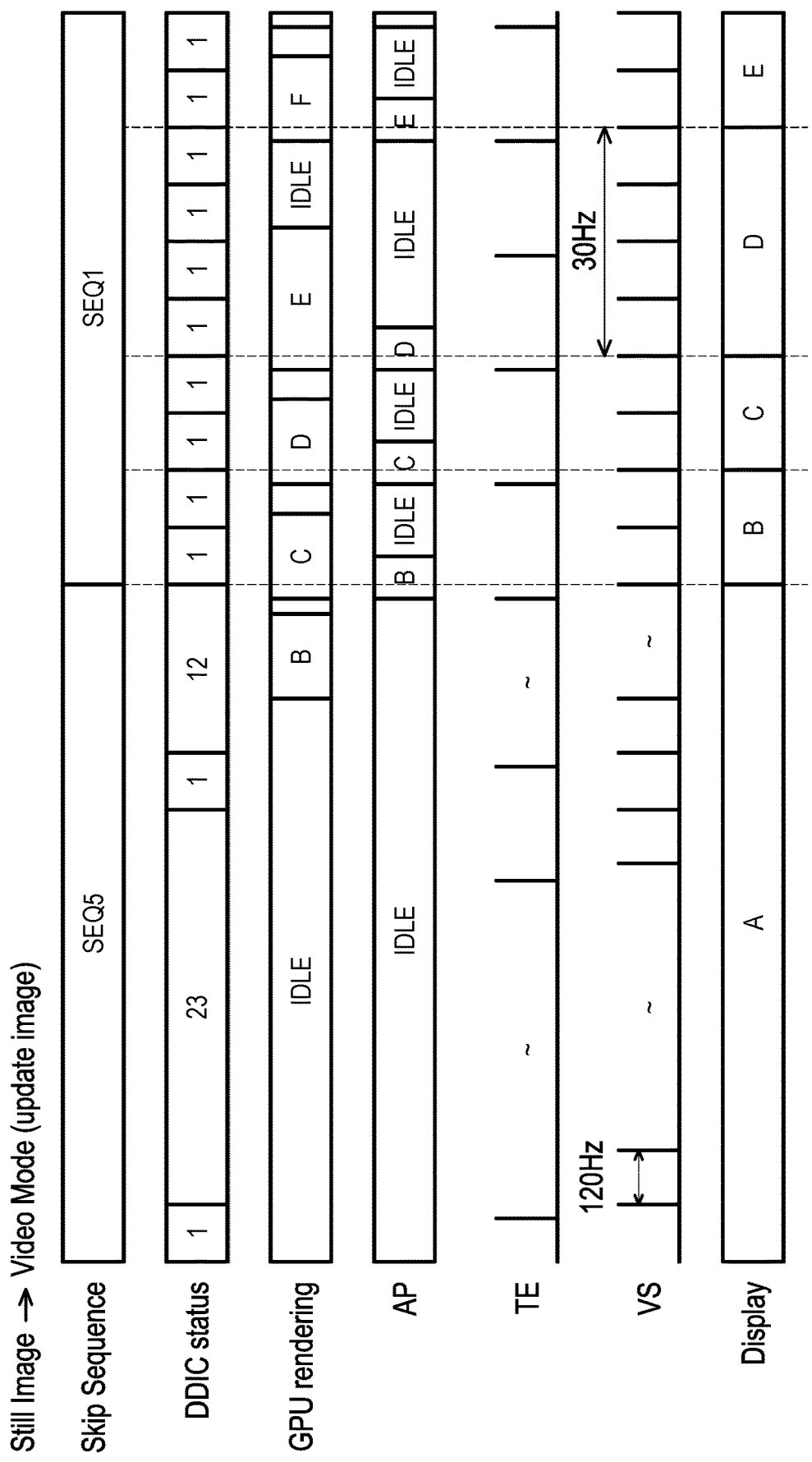
FIGS. 13A and 13B show a comparison between implementing the mechanism of frame synchronization and not implementing the mechanism of frame synchronization according to an exemplary embodiment of the disclosure.
Figure 13B:
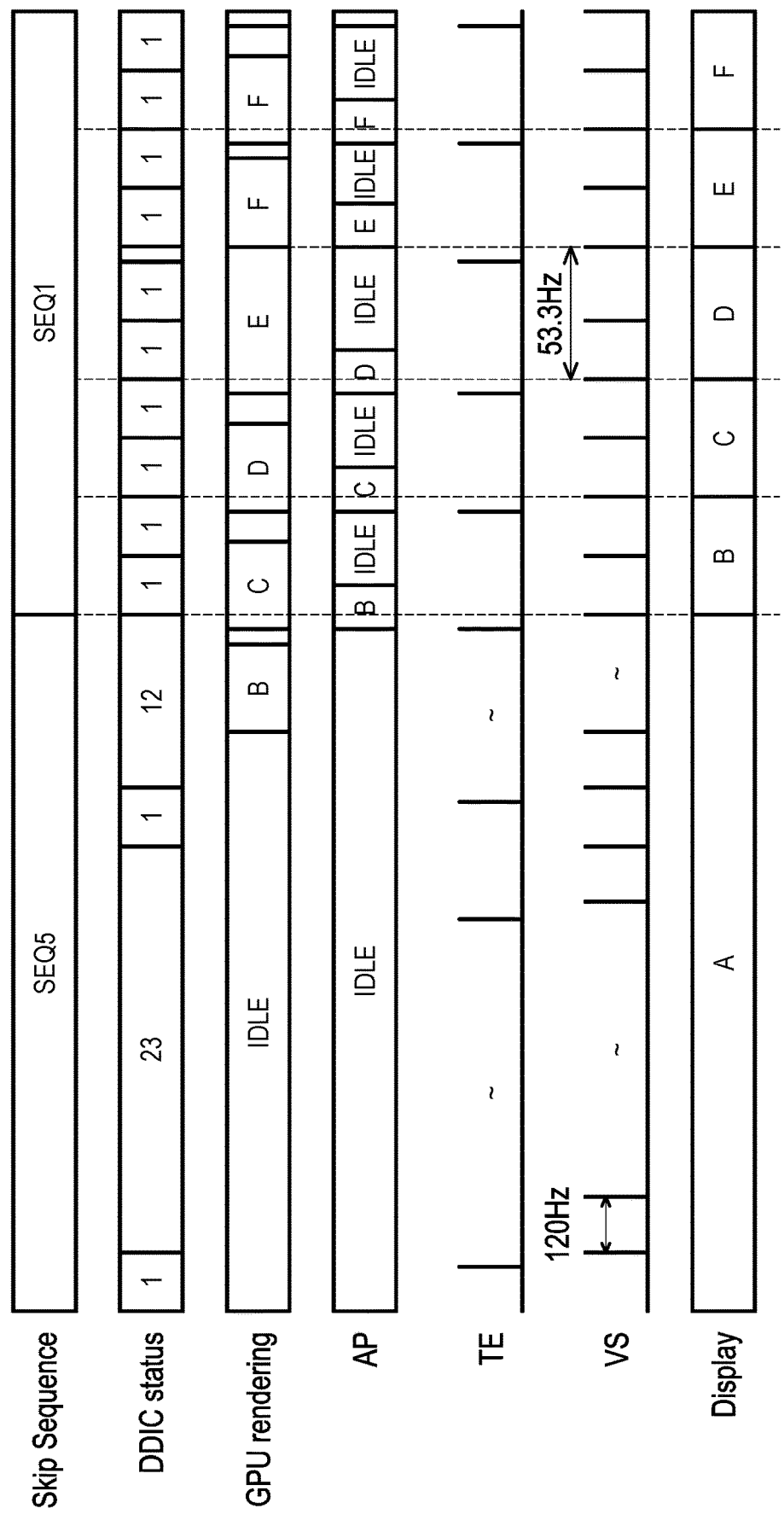

FIGS. 13A and 13B show a comparison between implementing the mechanism of frame synchronization (with wait time) and not implementing the mechanism of frame synchronization according to an exemplary embodiment of the disclosure. In this disclosure, the display system may turn on or turn off the implementation of wait time. For FIG. 13A, the timing diagram shows the situation when there is no update of new images while the display system operates under video mode in skip sequence 1. The Sync mode being off which means that the timing controller does not implement the wait time. With Sync mode being off, the VSync signal is transmitted at regular intervals to signal the beginning of a frame being refreshed. Whenever a frame is to be refreshed as indicated by the VSync signal but the AP has not sent any new image frame, the display panel will repeat the previous image frame. Under such mechanism, as shown in FIG. 13A, the image frame D is displayed for the duration of 4 consecutive frames and thus the frame rate is dropped to 30 Hz.

Referring to FIG. 13B which is a timing diagram that shows the situation when there is no update of new images while the display system operates under video mode in skip sequence 1 but with the Sync mode being on. The Sync mode being on, the timing controller would implement the mechanism of wait time. However, as soon as the AP sends a next image frame which is the image frame E, the wait time is over and the timing control would start processing the active frame corresponding to image frame E. Under such mechanism, as shown in FIG. 13B, the image frame D is displayed for the duration that is slightly longer than 2 consecutive frames and thus the frame rate would only be dropped to 53 Hz. As seen in the comparison between 13A and 13B, the drop of frame rate with Sync mode being on is meaningfully mitigated.

In view of the aforementioned descriptions, the present disclosure is suitable for being used in an electronic device or in a display system and is able to mitigate a drop of instantaneous frame rate when there is a delay in processing or transmission of image frames from the GPU.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An integrated circuit, comprising:
a timing controller to transmit a first tearing (TE) signal to an application processor and receive a first image frame from the application processor after the application processor receives the first TE signal, and
a control circuit to generate a first sync signal when the timing controller receives the first image frame, wherein when the application processor receives a second TE signal and the application processor is not ready to transmit a second image frame to the timing controller, the control circuit delays a first waiting period to generate a second sync signal, wherein the timing controller further to transmit a third TE signal to the application processor and receive a third image frame from the application processor after the application processor receives the third TE signal, and
the control circuit further to generate a third sync signal when the timing controller receives the third image frame, wherein when the application processor receives a fourth TE signal, the control circuit further to generate a fourth sync signal, and a first interval between the first sync signal and the second sync signal is different from a second interval between the third sync signal and the fourth sync signal.

2. The integrated circuit of claim 1, wherein when the application processor receives the fourth TE signal, the application processor is not ready to transmit a fourth image frame to the timing controller, and the control circuit further generates the fourth sync signal by delaying a second waiting period to generate the fourth sync signal, and the first waiting period is different from the second waiting period.

3. The integrated circuit of claim 1, wherein the first waiting period starts from the first TE signal and ends when the timing controller receives the second image frame.

4. The integrated circuit of claim 1, wherein the timing controller further to transmit a fifth TE signal to an application processor which is ready to transmit a fifth image frame upon receiving the fifth TE signal, and the control circuit further to generate a fifth sync signal when the timing controller receives the fifth image frame, wherein a duration between the fifth sync signal and the fourth sync signal is predetermined.

5. The integrated circuit of claim 1, wherein the application processor is not ready to transmit the second image frame to the timing controller comprising: the timing controller receiving either an idle frame or a same first image frame.

6. The integrated circuit of claim 5, wherein the first waiting period occurs during the idle frame or a same first image frame, and a counter starts in response to receiving the second TE signal.

7. The integrated circuit of claim 6, wherein a duration of the first waiting period is related to a skip sequence which changes in response to the counter having been expired except for a last skip sequence.

8. The integrated circuit of claim 7, wherein a value of the counter is dynamically adjustable.

9. The integrated circuit of claim 1, wherein the first waiting period is not periodic, and is less than a duration of one image frame.

10. The display panel of claim 1, wherein the first waiting period is not periodic, and is less than a duration of one image frame.

11. A display panel comprising:
a display comprising a pixel array for displaying images, and
an integrated circuit coupled to the display and comprising:
a timing controller to transmit a first tearing (TE) signal to an application processor and receive a first image frame from the application processor after the application processor receives the first TE signal, and
a control circuit to generate a first sync signal when the timing controller receives the first image frame, wherein when the application processor receives a second TE signal and the application processor is not ready to transmit a second image frame to the timing controller, the control circuit delays a first waiting period to generate a second sync signal, wherein the timing controller further to transmit a third TE signal to an application processor and receive a third image frame from the application processor after the application processor receives the third TE signal, and
the control circuit further to generate a third sync signal when the timing controller receives the third image frame, wherein when the application processor receives a fourth TE signal, the control circuit further to generate a fourth sync signal, and a first interval between the first sync signal and the second sync signal is different from a second interval between the third sync signal and the fourth sync signal.

12. The display panel of claim 11, wherein when the application processor receives the fourth TE signal, the application processor is not ready to transmit a fourth image frame to the timing controller, and the control circuit further to generate a fourth sync signal the timing controller is to the timing controller, the control circuit delays a second waiting period to generate the fourth sync signal, and the first waiting period is different from the second waiting period.

13. The display panel of claim 11, wherein the first waiting period starts from the first TE signal and ends when the timing control receives the second image frame.

14. The display panel of claim 11, wherein
the timing controller further to transmit a fifth TE signal to an application processor which is ready to transmit a fifth image frame upon receiving the fifth TE signal, and
the control circuit further to generate a fifth sync signal when the timing controller receives the fifth image frame, wherein a duration between the fifth sync signal and the fourth sync signal is predetermined.

15. The display panel of claim 11, wherein the application processor is not ready to transmit the second image frame to the timing controller comprising: the timing controller receiving either an idle frame or a same first image frame.

16. The display panel of claim 15, wherein the first waiting period occurs during the idle frame or a same first image frame, and a counter starts in response to receiving the second TE signal.

17. The display panel of claim 11, wherein a value of the counter is dynamically adjustable.

18. A display system comprising:
an electronic device comprising:
a graphics control unit (GPU), and
an application processor (AP) coupled to the GPU and configured to output a plurality of render images to a display panel, and
the display panel comprising:
a display, and
an integrated circuit coupled to the display and comprising:
a timing controller to transmit a first tearing (TE) signal to an application processor and receive a first image frame from the application processor after the application processor receives the first TE signal, and
a control circuit to generate a first sync signal when the timing controller receives the first image frame, wherein when the application processor receives a second TE signal and the application processor is not ready to transmit a second image frame to the timing controller, the control circuit delays a first waiting period to generate a second sync signal, wherein the timing controller further to transmit a third TE signal to an application processor and receive a third image frame from the application processor after the application processor receives the third TE signal, and
the control circuit further to generate a third sync signal when the timing controller receives the third image frame, wherein when the application processor receives a fourth TE signal, the control circuit further to generate a fourth sync signal, and a first interval between the first sync signal and the second sync signal is different from a second interval between the third sync signal and the fourth sync signal.

* * * * *